Figure 1:
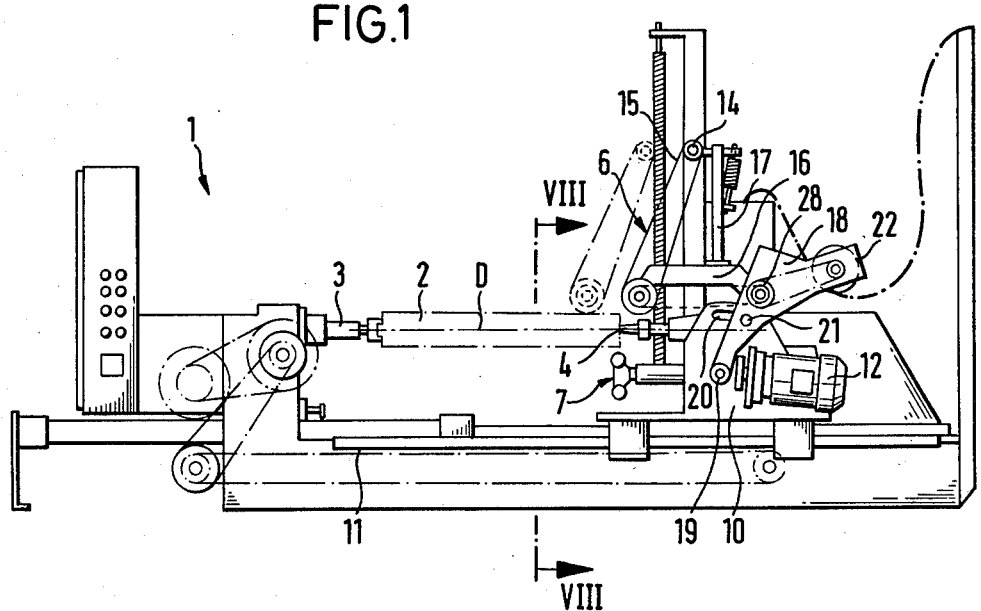

United States Patent [19]

Schmidt

[11] 4,274,183

[45] Jun. 23, 1981

[54] APPARATUS FOR COPY-MACHINING OF A WORKPIECE

[75] Inventor: Erich Schmidt, Mauerbach, Austria

[73] Assignee: Maschinenfabrik Zuckermann Komm. Ges., Austria

[21] Appl. No.: 39,607

[22] Filed: May 16, 1979

[30] Foreign Application Priority Data

May 18, 1978 [DE] Fed. Rep. of Germany ....... 2821788

[51] Int. Cl.³ .............................................. B23B 3/28
[52] U.S. Cl. ........................................ 29/28; 51/49;
142/3; 142/7; 409/113; 409/213
[58] Field of Search ...................... 142/7, 3, 1, 11, 13,
142/15; 82/14 R, 14 A, 14 B; 29/27 C, 28;
409/213, 113, 217; 51/49, 47, 51

[56] References Cited

U.S. PATENT DOCUMENTS

| | | | |
|---|---|---|---|
| 2,161,311 | 6/1939 | Ott | 51/49 |
| 2,539,107 | 1/1951 | Sectish | 409/213 X |
| 3,413,893 | 12/1968 | Wilson | 409/217 |
| 3,863,691 | 2/1975 | Schmidt | 142/7 |
| 4,211,040 | 7/1980 | Stevdten et al. | 51/49 X |

Primary Examiner—William R. Briggs
Attorney, Agent, or Firm—Finnegan, Henderson, Farabow, Garrett & Dunner

[57] ABSTRACT

An improvement is disclosed in apparatus for copy-machining a workpiece from a master model, the apparatus being moved along the workpiece by a feed mechanism in response to the scanning of the master model. The improvement comprises a first tool and a second tool mounted on the feed mechanism, a pivot arm for supporting the second tool for movement relative to the first tool in the direction of movement along said workpiece, and means for locking said pivot arm and second tool at a desired position, said first and second tools engaging the workpiece in staggered relationship to one another, with reference to the direction of movement along said workpiece, wherein the relative positions of said first and second tools are adjustable by movement of the second tool in response to movement of the pivot arm and locking the pivot arm and second tool at the desired position. Apparatus is also disclosed wherein the pivot arm is situated substantially orthogonal to the direction of movement along said workpiece.

9 Claims, 8 Drawing Figures

U.S. Patent   Jun. 23, 1981   Sheet 1 of 4   4,274,183

APPARATUS FOR COPY-MACHINING OF A WORKPIECE

This invention relates to apparatus for copy-machining a workpiece mounted in a clamping device, comprising at least two tools, for instance a shaping tool, particularly a milling assembly, and a surface finishing tool, particularly a belt grinding assembly, supported on a common feed mechanism for simultaneous movement along said workpiece in response to the scanning of a master model, and for engaging said workpiece in staggered relationship to one another in the direction of feed.

Apparatus of the above type is generally known in the art. Both tools are mounted for movement towards the workpiece and away from it for performing the copy-machining operation. They are rigidly interconnected, however, as regards their spacing in the direction of feed. In this manner it is substantially determined which of the tools performs the pre-shaping operation and which one the finishing work, since the pre-shaping tool always has to precede the finishing tool in the direction of feed, so as to enable the finishing work to be performed. To provide for the possibility of replacing tool elements of normal dimensions by tools of greater dimensions, the spacing of the tools in the direction of feed is selected such that the tools do not interfere with one another, even if tools of greater dimensions are used.

This relatively great spacing results in the disadvantage, however, that the feeding mechanism has to travel over an extended distance to enable the trailing finishing tool to work on the furthermost end portion of the workpiece.

It is an object of the invention to improve an apparatus of the type set forth above in such a manner that it is possible to vary the sequence of operation of the tools employed for copy-machining while keeping the feeding travel to a minimum.

To achieve this object, the invention provides that the magnitude of stagger between the two tools, or the position of said tools relative to one another governing the sequence of operation thereof, respectively, is adjustable by at least one tool being mounted on said feed mechanism so as to be movable relative to the other in the direction of feed with the movable tool being adapted to be locked at the selected spacing.

This construction results in several advantages. The stagger of the two tools may be selected such that the spacing between the tools following one another in operation is as small as possible. Thanks to the adjustability of one tool relative to the other, the size of the tools is no longer of any importance. The tools can always be adjusted relative to one another so that they follow one another very closely during operation. This is of particular advantage if the tools engage the workpiece with relatively strong forces, since the small spacing between the tools results in a correspondingly smaller moment acting on the workpiece, so that the deformation caused thereby is reduced.

In addition, the smaller spacing between the tools results in the further advantage that the feeding mechanism may initiate its return travel at an earlier stage at the end of the workpiece, since the spacing between the tools can now be selected as small as possible. This results in an improved utilization of the work potential of the machine.

The relative adjustability of the one tool with respect to the other is of decisive importance in cases where it is not only intended to position the adjustable tool as close as possible to the other tool while maintaining the given sequence of operation, but where it is intended to position the adjustable tool beyond the other tool so as to reverse the sequence of operation of the two tools. In the latter case it is possible to utilize the advancing stroke as well as the return stroke of the feed mechanism for machining the workpiece while maintaining the correct sequence of operation of the tools. Thus the non-adjustable tool may be employed for rough-shaping during the advancing stroke, and for shape-finishing during the return stroke, while the adjustable tool is kept out of engagement with the workpiece during the advancing stroke and is employed for surface-finishing during the return stroke. In this case, the adjustable tool precedes the non-adjustable tool in the direction of feed during the advancing stroke, so that the correct sequence of operation is established for the return stroke.

In an advantageous embodiment of the invention, the relatively adjustable tool is supported by a pivot arm, which in its normal position is oriented substantially vertical with respect to the direction of feed. Adjustment of the pivot arm permits the adjustable tool to be readily positioned relative to the other tool. Locking of the pivot arm for maintaining the selected spacing between the tools is also readily accomplished.

In order that the sequence of operation of the tools may be selectively adjusted, the pivot range of the pivot arm is preferably selected such that the tool carried thereby may be set to operate in front or at the rear of the other tool as seen in the direction of feed.

It is particularly advantageous for machining elongate and thin workpieces, to provide the feed mechanism with a workpiece support or steadying rest, possibly in combination with a pre-shaping tool, for supporting the workpiece in close proximity in front of the tools during the machining thereof.

Figure 2:
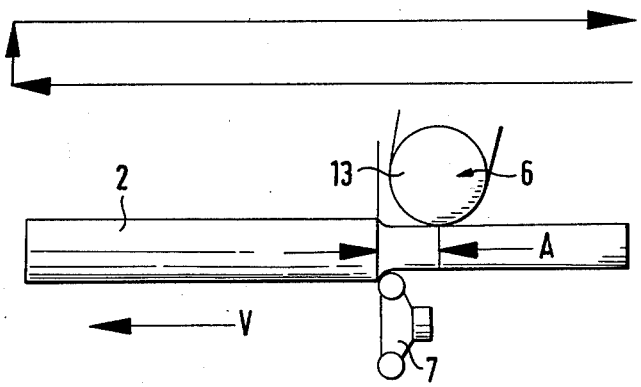
Figure 3:
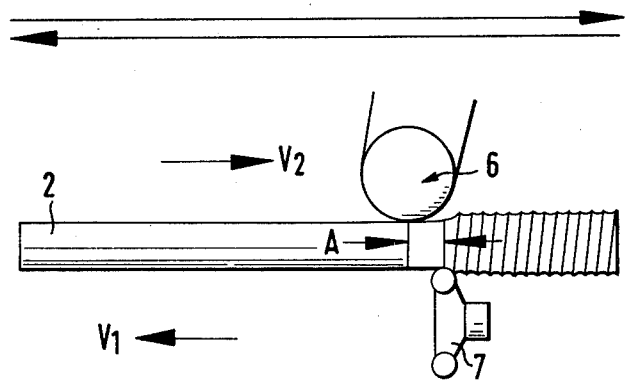
Figure 8:
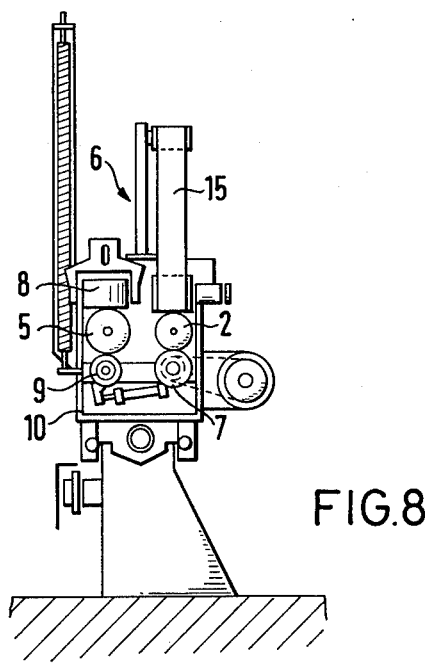
Figure 4:
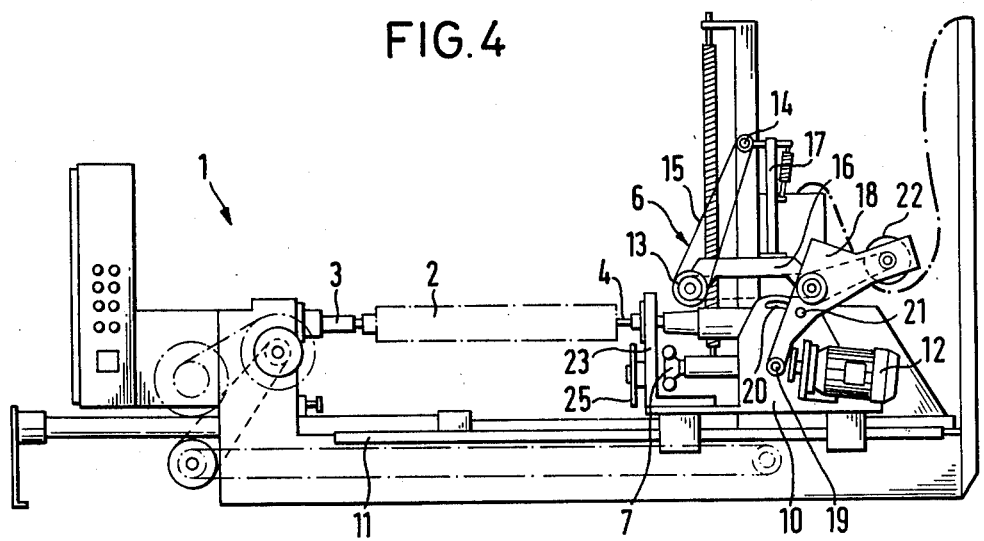
Figure 5:
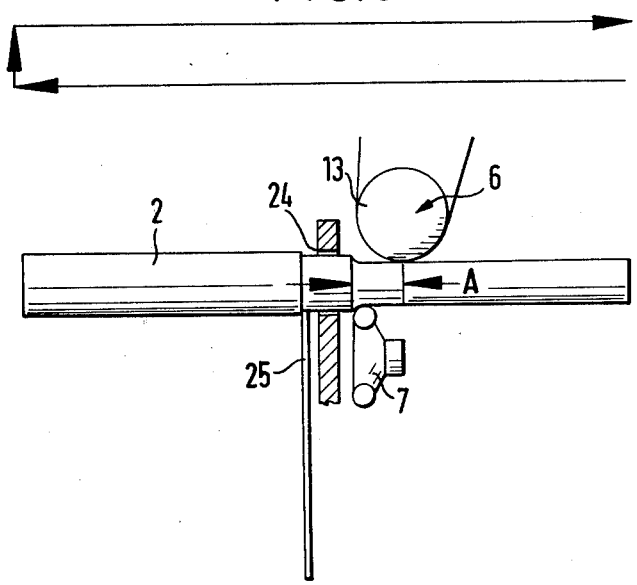
Figure 6:
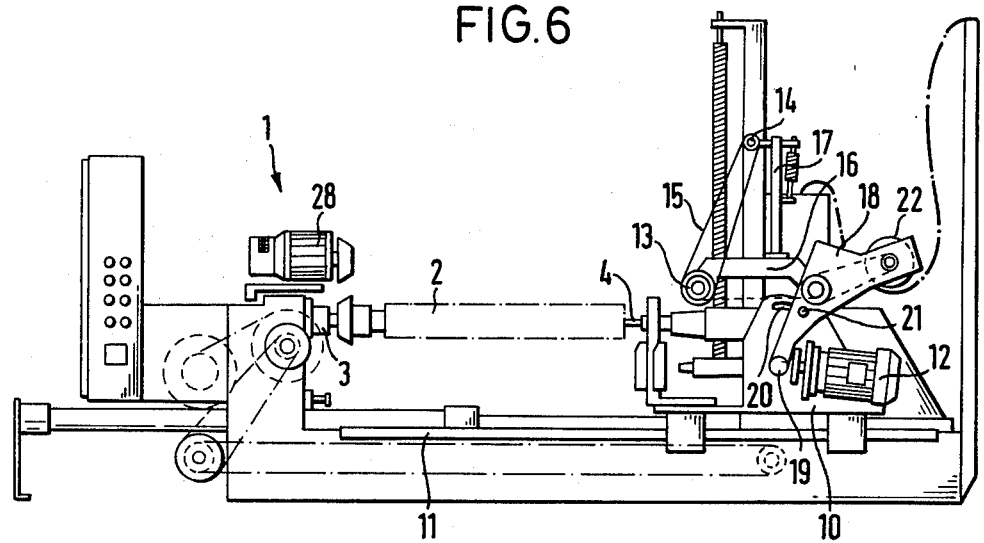
Figure 7:
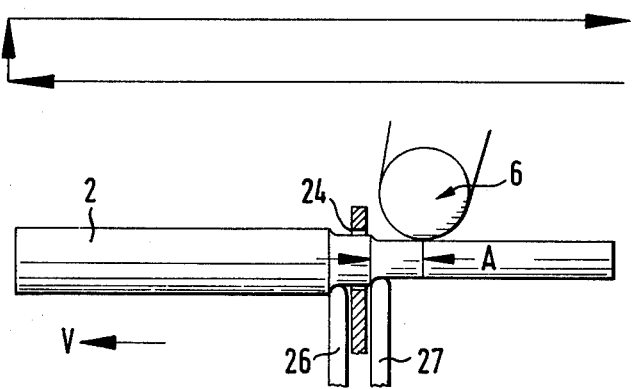

Embodiments of the invention shall now be described with reference to the accompanying drawings, wherein:

FIG. 1 shows a side view of a first embodiment of the invention,

FIG. 2 shows a diagrammatic view of the engagement of the tools in the apparatus according to FIG. 1 with a workpiece, FIG. 3 shows a diagrammatic view of the tools in the apparatus according to FIG. 1 engaging the workpiece in a different sequence, FIG. 4 shows a second embodiment of the invention, FIG. 5 shows a diagrammatic view of the tools in the apparatus according to FIG. 4 in engagement with a workpiece, FIG. 6 shows a side view of a further embodiment of the invention also employable for turning workpieces, FIG. 7 shows a diagrammatic view of the engagement of the tools in the apparatus of FIG. 6 with a workpiece, and FIG. 8 shows a cross-sectional view of the apparatus shown in FIG. 1.

FIGS. 1 and 8 show a first embodiment of apparatus 1 according to the invention for machining a workpiece 2. In the embodiment shown, the apparatus is designed for copy-machining only a single workpiece. It is also possible, however, to design the apparatus such as to permit the simultaneous machining of several workpieces, for instance in a side-by-side arrangement.

The apparatus shown has a basic construction similar to that of conventional machines of this kind. The apparatus includes drive means for rotating the workpiece in its circumferential direction for machining the entire circumferential surface of the workpiece.

As shown in FIG. 8, a master model 5 is disposed adjacent the workpiece and parallel thereto, said master model being mounted in a clamping device for rotation in synchronism with the workpiece.

A belt grinding assembly 6 and a milling assembly 7 are provided above and below the workpiece, respectively, for machining the workpiece. Since the workpiece is to be copy-machined, the tool assemblies 6, 7 are operatively coupled with respective scanning rollers 8 and 9 engaging the master model at opposite sides in an arrangement similar to that of the tools. The tools as well as the scanning means are supported in a feed mechanism 10 for movement towards the workpiece, or the master model, respectively, and away therefrom. The feed mechanism 10 comprises a carriage mounted for movement along guide rods 11 parallel to the axis of rotation of the workpiece extending between the clamping elements 3 and 4. Movement of the carriage 10 is accomplished by a drive mechanism not shown in detail, for instance by means of a driven lead screw.

As shown in FIGS. 1 and 2, milling assembly 7 has its axis of rotation aligned substantially parallel to the axis of rotation D of the workpiece. The linear sections of the grinding belt 10 extend at an angle to the axis of rotation, with the grinding belt as a whole being aligned substantially radial with respect to the axis of rotation D. The milling assembly is supported by a pivot arm (not shown) mounted on carriage 10. The drive motor for the milling tool is designated by reference numeral 12.

The belt grinding assembly 6 includes a contact roller 13 and a guide roller 14. A grinding belt 15 extends around both rollers. The contact roller 13 is supported by the free end of an arm 16, from which a spacer arm 17 is directed upwards to the guide roller 14. Arm 16 is pivotally connected to a pivot arm 18 by means of a bolt 28, the pivot arm 18 itself being pivotally mounted on carriage 10 by means of a bolt 19. The axis of bolt 19 is disposed at the same level as the axis of rotation of the milling assembly 7. In its normal position the pivot arm 18 is aligned substantially vertical with respect to the axis of rotation D. Its pivoting range is determined by an arcuate slot 20 engaged by a locking pin 21 secured to pivot arm 18 and enabling the pivot arm to be locked in different positions relative to the carriage.

At a rearward end of the pivot arm there is provided a drive motor 22 for rotating the contact roller 13 via a V-belt drive.

In operation of the apparatus shown, a blank is first manually inserted in the clamping device and clamped therein. After starting rotation of the workpiece the tool assemblies are moved to their operating positions, and the feed mechanism is started. The machining of a workpiece 2 in this manner is shown in FIG. 2, with the feed direction being designated by the letter V. In the arrangement shown, the milling assembly 7 precedes the belt grinding assembly by a distance designated A. This distance may be determined by means of the above described mounting of the belt grinding assembly. After releasing the locking pin 21, the pivot arm 18 may be pivoted to a position in which the belt grinding assembly is located as closely as possible to the milling assembly 7. This close spacing of the tools results in the tools supporting one another, so that their operating pressures are substantially cancelling one another and the moment exerted by the operating pressures remains within acceptable limits.

After the leading tool has reached the end of the workpiece, the carriage 10 has to be advanced only over a small further distance for bringing the work done by the trailing tool, in this case by the belt grinding assembly 6, to an end, whereupon the return stroke may be initiated.

For performing a machining operation as diagrammatically shown in FIG. 3, the pivot arm 18 may be pivoted to the left of its position shown in FIG. 1, so that the belt grinding assembly overtakes the milling assembly and precedes this assembly as seen in the feed direction V in FIG. 2. In this arrangement of the tools, the milling assembly is employed for rough-shaping the workpiece during the advancing stroke in the direction V1, as can still be seen at the righthand end of the workpiece. During the return stroke in the opposite direction V2, the milling assembly 7 is employed for shape-finishing the workpiece, whereupon the belt grinding assembly 6 may perform the surface finishing operation. During the machining operation in the direction V1 the belt grinding assembly does not engage the workpiece. The corresponding position of the belt grinding assembly relative to the milling assembly is shown in phantom lines in FIG. 1.

FIGS. 4 and 5 show a further embodiment of the invention. This embodiment corresponds substantially to the one shown in FIG. 1, similar parts being therefore denoted by the same reference numerals. In the embodiment of FIGS. 4 and 5, the apparatus is additionally provided with a workpiece support or steadying rest in the form of a collar. This support is particularly advantageous for machining elongate and thin workpieces, in which case the collar effectively prevents sagging or bending of the workpiece. The collar is mounted on carriage 10 and has a through-opening 24 for the passage of the workpiece 2. For ensuring a proper centering of the collar with respect to the workpiece, the collar is preceded by a pre-shaping tool, in the present case by a milling disc 25 for reducing the diameter of the workpiece to that of the through-opening 24 of the collar. As shown in FIG. 5, the tools 6 and 7 are disposed immediately rearward of the collar at the same relative positions as in FIG. 2, that is at a minimum distance A to one another.

The apparatus shown in FIGS. 6 and 7 is again substantially similar to the embodiment of FIG. 1, corresponding parts being therefore again denoted by the same reference numerals. This embodiment also employs a support collar having a through opening 24 in combination with two turning bits 26, 27 for reducing the diameter of the rotating workpiece 2 in two steps. The first turning bit 26 reduces the diameter of the workpiece to that of the opening 24 of the collar, while the trailing turning bit 27 serves to reduce the diameter, for instance in a shape-finishing operation, to the final size for subsequent surface-finishing by the grinding tools 6. Also in this case, the amount of stagger, i.e. the distance A between the turning bit and the grinding tool 6 is kept to a minimum. Since in a turning operation the workpiece 2 has to be rotated at a very high speed, the frame of the apparatus carries a supplementary drive source 28 for rotating the workpiece with the required speed via a transmission arrangement, for instance a belt transmission.

The workpieces to be machined are preferably of wood or of a material having similar machining properties.

The belt grinding assembly 13, 14, 15 and the scanning roller 8 associated therewith are mounted in a known manner on a first rigid carrier arm unit 16, itself pivotably mounted on an axis 28, said axis carrying in addition a V-belt sheave serving to maintain a substantially constant length of the V-belt transmission for the contact roller 13 of the belt grinding assembly.

The locking pin 21 is suitably designed for rigidly clamping the pivot arm 18 to the carriage 10 so as to ensure a proper positioning of the pivot arm.

The milling assembly 7 and the scanning roller 9 associated therewith are also mounted in the known manner on a second carrier arm unit itself mounted for pivotal movement about a pivot axis. Both carrier arm units are resiliently biased into engagement with the workpiece by pneumatic cylinders, or preferably by suitable springs.

I claim:

1. In apparatus for copy-machining a workpiece from a master model, the apparatus being moved along the workpiece by a feed mechanism in response to the scanning of said master model, the improvement comprising:
a first tool and a second tool mounted on said feed mechanism, a pivot arm for supporting the second tool for movement relative to the first tool in the direction of movement along said workpiece, and means for locking said pivot arm and second tool at a desired position, said first and second tools engaging the workpiece in staggered relationship to one another, with reference to the direction of movement along said workpiece, wherein the relative positions of said first and second tools are adjustable by movement of the second tool in response to movement of the pivot arm and locking the pivot arm and second tool at the desired position.

2. Apparatus as claimed in claim 1, wherein the pivot arm is situated substantially orthogonal to the direction of movement along said workpiece.

3. Apparatus as claimed in claims 1 or 2, wherein the first tool comprises a shaping tool and wherein the second tool comprises a surface finishing tool.

4. Apparatus as claimed in claim 3, wherein said shaping tool comprises milling apparatus and wherein said surface finishing tool comprises belt grinding apparatus.

5. Apparatus as claimed in claims 1 or 2, wherein the pivoting range of said pivot arm is such that the second tool may be adjusted to operate either in front of or behind the first tool, as seen in the direction of movement along said workpiece.

6. Apparatus as claimed in claims 1 or 2, further comprising a workpiece support secured to the feed mechanism for supporting the workpiece in close proximity in front of the first and second tools, as seen in the direction of movement along said workpiece.

7. Apparatus as claimed in claim 6, further comprising preshaping means secured to the feed mechanism in front of the first and second tools, as seen in the direction of movement along said workpiece, for shaping the workpiece prior to its engagement by the first and second tools.

8. Apparatus as claimed in claim 7, wherein said preshaping means precedes said workpiece support.

9. Apparatus as claimed in claim 7, wherein said preshaping means comprises first and second turning bits, and wherein said workpiece support is positioned between said first and second turning bits.

* * * * *